(No Model.)
G. J. RIBLET, Sr.
WAGON BRAKE LEVER.
No. 374,004. Patented Nov. 29, 1887.
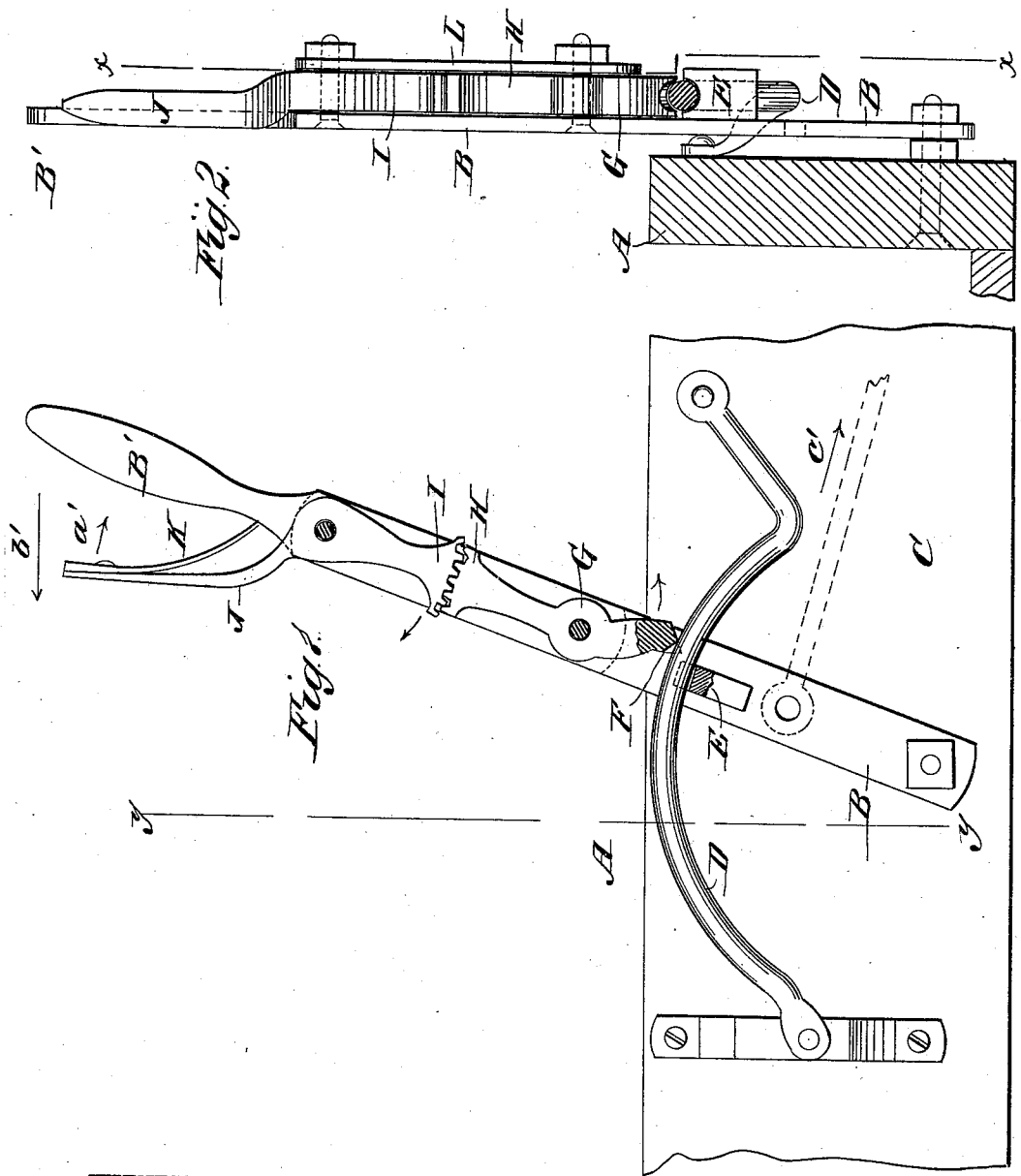
WITNESSES:
F. McArdle.
C. Sedgwick
INVENTOR:
G. J. Riblet Sr.
BY Munn & Co.
ATTORNEYS.

UNITED STATES PATENT OFFICE.

GEORGE J. RIBLET, SR., OF SHINNSTON, WEST VIRGINIA.

WAGON-BRAKE LEVER.

SPECIFICATION forming part of Letters Patent No. 374,004, dated November 29, 1887.

Application filed June 16, 1887. Serial No. 241,555. (No model.)

*To all whom it may concern:*

Be it known that I, GEORGE J. RIBLET, Sr., of Shinnston, in the county of Harrison and State of West Virginia, have invented a new and Improved Lever-Lock for Wagon-Brakes, of which the following is a full, clear, and exact description.

The object of my invention is to provide a new and improved lock for the lever of a wagon-brake, in which the lever is firmly held in place when the brakes are applied.

The invention consists of a lever fulcrumed on the brake hand-lever and engaging with one end a fixed segment, and of a spring-lever fulcrumed on the brake hand-lever and provided with a segmental gear-wheel arm meshing into a segmental gear-wheel arm formed on the other lever.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a sectional side elevation of my improvement on the line $x\,x$ of Fig. 2, and Fig. 2 is a sectional end elevation of the same on the line $y\,y$ of Fig. 1.

On the side-board A of the wagon is pivoted in the usual manner the brake hand-lever B, provided on its upper end with the handle B', and connected near its fulcrum with the brake-rod C, connected with the brake mechanism in the usual manner. Above the fulcrum of the rod C and on the hand-lever B is placed a lug, E, having a semicircular groove in its stock, fitting loosely around the lower half of the round segment D, secured by suitable means to the side-board A of the wagon. The center of the segment D is in the fulcrum of the brake hand-lever B. The upper half of the fixed segment D is encircled by a half-round notch, F, formed in the lower end of the lever G, pivoted on the brake hand-lever B, said notch F having a sharp edge, so as to impinge on the upper half of the fixed segment D.

On the upper end of the lever G is formed a segmental gear-wheel arm, H, which meshes into the segmental gear-wheel arm I, formed on the lever J, pivoted on the brake hand-lever B, and provided with a spring, K, the free end of which rests against one edge of the handle B' of the brake hand-lever B. The spring K presses the lever J outward from the handle B', so that the segmental gear-wheel arm I is moved inward, thereby causing a similar movement of the segmental gear-wheel arm H, whereby the notched or grooved end of the lever H is moved outward and engages with its sharp edge the upper half of the fixed segment D, thus holding the brake hand-lever B securely in position on the segment D.

If the operator desires to apply the brake, he takes hold of the handle B' and presses the spring-lever J inward in the direction of the arrow $a'$, whereby the grooved end of the lever G disengages the segment D and thus enables the operator to move the hand-lever B forward in the direction of the arrow $b'$, thus applying the brakes by the rod C. As soon as the brakes are applied, the operator releases his pressure on the spring-lever J, so that the spring K forces said lever J outward, whereby the lower grooved end of the lever G engages and impinges on the upper half of the fixed segment D, thus holding the lever B in a firm position. It will be seen that the strain now exerted by the brakes against the rod C in the direction of the arrow $c'$ has the tendency to pull the lever B in the same direction, whereby, however, the sharp edge of the groove F impinges more securely on the upper half of the fixed segment D.

Having thus fully described my invention, I claim as new and desire to secure by Letters Patent—

1. In a lever-lock for wagon-brakes, the combination, with the brake hand-lever and a plain fixed segment, of a lever pivoted to the hand-lever, and having its lower edge grooved to receive the upper part of the fixed segment, and a segmental gear on its upper end, and a spring-pressed lever pivoted on the hand-lever and provided with a segmental gear on its lower end engaging the gear of the grooved lever, substantially as herein shown and described.

2. In a lever-lock for wagons, the combination, with the hand-lever B, provided with the grooved lug E and the round segment D, of the lever G, pivoted to the hand-lever and provided with the groove F in its lower end, and with the segmental gear H, the lever J, pivoted to the hand-lever above the lever G, and provided with the segmental gear I, meshing with the gear H, and the spring K, substantially as herein shown and described.

GEORGE J. RIBLET, SR.

Witnesses:
V. B. DAVIS,
LAWRENCE SHORT.